(12) United States Patent
Van Der Meijden

(10) Patent No.: US 12,025,380 B2
(45) Date of Patent: Jul. 2, 2024

(54) HEAT EXCHANGER AND USE OF HEAT EXCHANGER

(71) Applicant: IRELIEMAR B.V., Udenhout (NL)

(72) Inventor: Cornelis Adrianus Van Der Meijden, Udenhout (NL)

(73) Assignee: IRELIEMAR B.V., Udenhout (NL)

( * ) Notice: Subject to any disclaimer, the term of this patent is extended or adjusted under 35 U.S.C. 154(b) by 216 days.

(21) Appl. No.: 17/793,303

(22) PCT Filed: Jan. 19, 2021

(86) PCT No.: PCT/EP2021/051005
§ 371 (c)(1),
(2) Date: Jul. 15, 2022

(87) PCT Pub. No.: WO2021/148374
PCT Pub. Date: Jul. 29, 2021

(65) Prior Publication Data
US 2023/0349642 A1 Nov. 2, 2023

(30) Foreign Application Priority Data
Jan. 21, 2020 (NL) .................................. 2024720

(51) Int. Cl.
*F28D 11/02* (2006.01)
*F28D 7/10* (2006.01)
(Continued)

(52) U.S. Cl.
CPC .............. *F28D 11/02* (2013.01); *F28D 7/103* (2013.01); *F28F 1/426* (2013.01); *F28F 5/06* (2013.01);
(Continued)

(58) Field of Classification Search
CPC . F28D 11/02; F28D 7/103; F28F 1/426; F28F 5/06; F28F 13/125; F28F 2210/06; F28F 2250/08; A23L 3/22
(Continued)

(56) References Cited

U.S. PATENT DOCUMENTS 3,730,229 A 5/1973 D'Onofrio
5,964,278 A 10/1999 Langoy et al.

FOREIGN PATENT DOCUMENTS

EP 3392591 A1 10/2018
FR 1581806 A 9/1969
(Continued)

OTHER PUBLICATIONS

International Search Report and Written Opinion dated May 26, 2021 for Application No. PCT/EP2021/051005.
(Continued)

*Primary Examiner* — Davis D Hwu
(74) *Attorney, Agent, or Firm* — Patterson + Sheridan, LLP

(57) ABSTRACT

There is provided a heat exchanger adapted to exchange heat between a first fluid and a second fluid. The heat exchanger comprises an outer tubular body, an inner body, a first inlet, a first outlet, a second inlet and a second outlet. The outer tubular body has an inner surface. The inner body is arranged inside the outer tubular body and has an outer surface facing the inner surface of the outer tubular body, leaving free a gap between the inner surface of the outer tubular body and the outer surface of the inner body. The first inlet and the first outlet are arranged to provide a first flow path for the first fluid from the first inlet to the first outlet via a first channel and via a second channel. The second inlet and the second outlet are arranged to provide a second flow path from the second inlet to the second outlet
(Continued)

Figure 1:
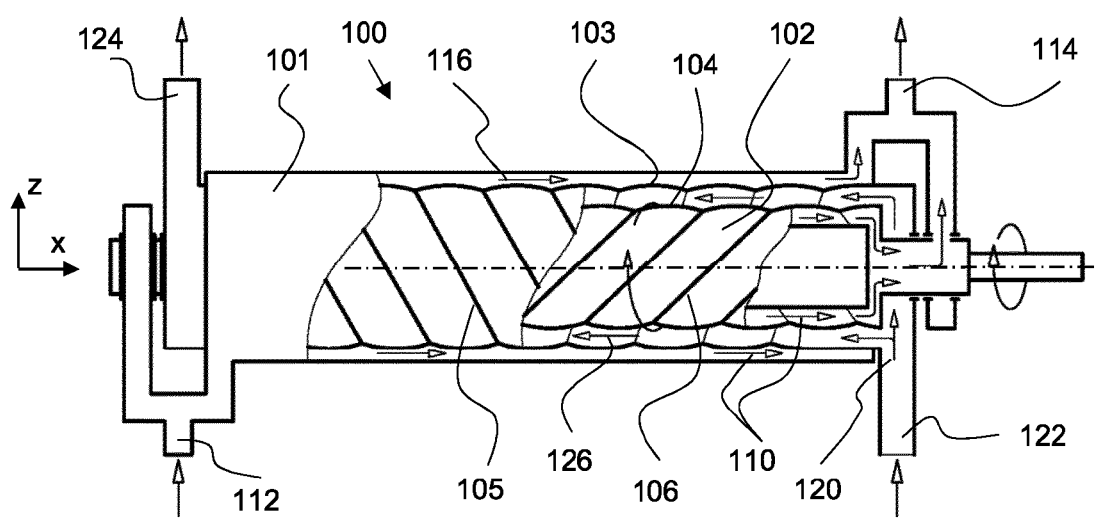

for the second fluid in the gap between the inner surface of the outer tubular body and the outer surface of the inner body. The outer tubular body comprises the first channel. The inner body comprises the second channel. The inner body and the second channel are rotatable relative to the outer tubular body and the first channel.

36 Claims, 5 Drawing Sheets

(51) Int. Cl.
*F28F 1/42* (2006.01)
*F28F 5/06* (2006.01)
*F28F 13/12* (2006.01)
*A23L 3/22* (2006.01)

(52) U.S. Cl.
CPC ............... *F28F 13/125* (2013.01); *A23L 3/22* (2013.01); *F28F 2210/06* (2013.01); *F28F 2250/08* (2013.01)

(58) Field of Classification Search
USPC .......................................................... 165/89
See application file for complete search history.

(56) References Cited

FOREIGN PATENT DOCUMENTS

| | | |
|---|---|---|
| FR | 2818367 A1 | 6/2002 |
| WO | 2018013415 A1 | 1/2018 |

OTHER PUBLICATIONS

Search Report and Written Opinion dated Sep. 10, 2020 for Application No. NL2024720.

HEAT EXCHANGER AND USE OF HEAT EXCHANGER

The invention relates to a heat exchanger and the use of a heat exchanger for exchanging heat with a fluid. More particular, the fluid is a high-viscosity fluid. The fluid is a food or a non-food.

In numerous applications, heat exchangers are used to transfer heat from a first fluid to a second fluid. For example, in the food industry, a known heat exchanger is used to transfer heat from a fluid food product to a heat carrier liquid, for example water. The heat exchanger can be used to apply heat via the water to the fluid food product to raise the temperature of the fluid food product, for example to sterilize or pasteurize the fluid food product or to achieve a chemical reaction of the fluid food product. The heat exchanger can also be used to remove heat via the water from the fluid food product to lower the temperature of the fluid food product, for example after the fluid food product has been pasteurized.

In the known heat exchanger, the fluid food product and the heat carrier liquid are separated from each other by a surface. Typically, the surface is formed by a tube. The heat carrier liquid is in contact with an outer surface of the tube, whereas the fluid food product is inside the tube and is in contact with an inner surface of the tube.

A special situation arises when the fluid food product is a high-viscosity fluid. Such fluid food products include pastes, honey, tomato-products, syrups, fruit and vegetable concentrates and animal fats. Such high-viscosity fluids can flow through a heat exchanger by applying sufficient pressure to push the high-viscosity fluid through the heat exchanger. Also, some high-viscosity fluids are sticky and easily leave residues in the heat exchanger. These residues affect heat transfer between the fluids. These residues, which may spoil if they remain in the heat exchanger for too long, might also affect the product quality. Therefore, regular cleaning of the heat exchanger is required to remove the residues. However, by cleaning the heat exchanger, the residues are discarded and thus wasted, because they do not end up in an end product. Also, the time needed to clean the heat exchanger reduces the production efficiency of the heat exchanger, because the heat exchanger cannot be used to process the fluid food product while being cleaned.

A known heat exchanger is disclosed in EP 2 759 796 A2, published on Jul. 30, 2014. The known heat exchanger has an outer shell with three inner tubes. In each inner tube, an elongated rotary rod is provided. Each of the elongated rotary rods is provided with scraping elements which are suitable for scraping a product fluid that has accumulated or is fixed on the inner wall of the inner tube. The elongated rotary rods are further provided with an endless spiral, running along and surrounding the rotary rod longitudinal through the spaces existing between the scraping elements. The endless spiral is suitable for displacement of the product fluid through the inner tube, generating a self-pumping effect. The outer shell has an inlet and an outlet intended for the circulation of a heat carrier liquid. The known heat exchanger is able to exchange heat between the product fluid and the heat carrier liquid via the inner surface of the inner tubes.

A disadvantage of the known heat exchanger is that when the scrapers remove the reside from the inner side of the inner tube, the scrapers scratch over the surface of the inner tube. As a result, the scrapers and the surface wear and particles are broken off. These metal particles end up in the food product.

Another disadvantage is that even though the scrapers remove the residue from the surface of the inner tube, a residue may still remain on the scrapers themselves. So cleaning of the heat exchanger is needed regularly, to remove the residue from the scrapers.

The known heat exchanger has three inner tubes in an attempt to increase a contact area between the product fluid and the heat carrier liquid. The contact area is provided by the inner surfaces of the inner tubes. The three inner tubes together have a larger contact area than a single inner tube would have with the same cross-section as the combined cross-sections of the inner tubes. However, the contact area is still rather limited, while it requires more pressure to push the product through the inner tubes than it would take through a single, larger inner tube.

It is an objective of the invention to provide a heat exchanger with an improved heat transfer.

The objective of the invention is achieved by a heat exchanger adapted to exchange heat between a first fluid and a second fluid, comprising:
  an outer tubular body having an inner surface;
  an inner body arranged inside the outer tubular body and having an outer surface facing the inner surface of the outer tubular body, leaving free a gap between the inner surface of the outer tubular body and the outer surface of the inner body;
  a first inlet and a first outlet arranged to provide a first flow path for the first fluid from the first inlet to the first outlet via a first channel and via a second channel;
  a second inlet and a second outlet arranged to provide a second flow path from the second inlet to the second outlet for the second fluid in the gap between the inner surface of the outer tubular body and the outer surface of the inner body,
  wherein the outer tubular body comprises the first channel,
  wherein the inner body comprises the second channel,
  wherein the inner body and the second channel are rotatable relative to the outer tubular body and the first channel,
  wherein the inner surface extends along a longitudinal axis,
  wherein a cross-section of the inner surface perpendicular to the longitudinal axis is non-circular.

The heat exchanger is adapted to exchange heat between a first fluid and a second fluid. The first fluid is, for example, a heat carrier liquid, such as water, a thermal oil, brine or glycol. Different types of fluids can be used. In an example, the first fluid is in a completely liquid-state. However, the first fluid does not need to be completely in a liquid-state. For example, the first fluid may contain a liquid and gas. For example, the first fluid comprises ammonia in a liquid phase and in a gas phase. During use, the ammonia transfers heat by changing the mass ratio between the liquid phase and the gas phase. An example of gas is carbon dioxide that is present in the first fluid to achieve a desired acidity with a desired pH-value of the first fluid. The gas can be dissolved in the first fluid or can be present in the first fluid in a gaseous-state so the gas forms bubbles in the first fluid. In view of explaining the invention, the first fluid is further indicated with the expression "heat carrier liquid".

The second fluid is, for example, a food product, such as a high-viscosity food fluid. The second fluid is a liquid, a combination of liquid and solids, a combination of liquid and gas, or a combination of liquid, solids and gas. For example, if the food product is a fruit juice, the second fluid can include pulp and seeds. If the food product is butter, the butter can be heated to a completely liquid state. The food product is, for example, food for animals, which is typically referred to as feed product or animal feed product. In an example, the second fluid behaves viscoelastic. The second fluid is, for example, a non-food product. A non-food product is, for example, a chemical product, such as a petro-chemical product or paint. The non-food product is, for example, fertilizer or a polymer. In all these examples, the second fluid has the property that it can flow. In view of explaining the invention, the second fluid is further indicated with the expression "product".

The outer tubular body is for example an elongated hollow body. Inside the outer tubular body, the inner body is arranged. A gap is defined between by the outer surface of the inner body and the inner surface of the outer tubular body. The gap is a space between the outer tubular body and the inner body. The product follows a flow path from an inlet to an outlet via the gap between the inner body and the outer tubular body. The inlet and the outlet are in communication with each other via the gap. Optionally, a pump is provided to push the product through the gap between the inner body and the outer tubular body.

An inlet and an outlet are provided for the heat carrier liquid to flow through the outer tubular body and the inner body. The outer tubular body has at least one channel and the inner body has at least one channel through which the heat carrier liquid flows via the first flow path. Heat is exchanged between the product and the outer tubular body and heat is exchanged between the product and the inner body. The first flow path is provided through the channel arranged in the outer tubular body and through the channel arranged in the inner body. The first flow path is arranged in both the outer tubular body and the inner body. A part of the first flow path is via the first channel through the outer tubular body. The first channel in the outer tubular body is in communication with the first inlet and the first outlet. The heat carrier liquid flows from the first inlet via the first channel in the outer tubular body to the first outlet. The first channel is for example arranged in a wall of the outer tubular body. Another part of the first flow path is via the second channel through the inner body. The second channel in the inner body is in communication with the first inlet and the first outlet. The heat carrier liquid flows from the first inlet via the second channel in the inner body to the first outlet. The first channel and the second channel are arranged parallel to each other or in series. The second inlet and the second outlet are arranged to provide the second flow path for the second fluid in the gap between the inner surface and the outer surface to exchange heat with the first fluid via both the inner surface and the outer surface.

The inner body is rotatable relative to the outer tubular body. In an embodiment, the outer tubular body is stationary, and the inner body is rotatable. When the inner body rotates, the second channel rotates along with the inner body. In an embodiment, the inner body is stationary and the outer tubular body is rotatable around the inner body. When the outer body rotates, the first channel rotates along with the outer tubular body. In another embodiment, both the outer tubular body and the inner body rotate, each at a different rotational speed.

By providing the first channel and the second channel in respectively the outer tubular body and the inner body, two heat transfer paths are created to exchange heat between the product and the heat carrier liquid. One heat transfer path is via the outer tubular body. The other heat transfer path is via the inner body. The heat carrier liquid exchanges heat with the product via the outer surface and via the inner surface.

The channels in the outer tubular body and the inner body receive the heat carrier liquid via a common inlet or via separate inlets on the heat exchanger. By providing the two heat transfer paths, the contact area of the heat exchanger with the product is enlarged, and as a result, the heat exchange is improved.

The inner body and the second channel together form a combined body that is rotatable relative to the outer tubular body and the first channel. The outer tubular body and the first channel together form a further combined body. Because inner body and the second channel together form the combined body, and because outer tubular body and the first channel together form the further combined body, less seals are required to separate the product and the heat carrier liquid. Reducing the number of seals, reduces the chance for a leakage of the product or the heat carrier liquid.

The inner surface of the outer tubular body extends along a longitudinal axis. The longitudinal axis is, for example, along the length of the outer tubular body. For example, the longitudinal axis is parallel to a longitudinal direction of the inner body. The product flows along the second flow path, which is for a substantial part in a direction parallel the longitudinal axis. By making the cross-section of inner surface perpendicular to the longitudinal axis non-circular, the distance between the inner surface of the outer tubular body and the outer surface of the inner body is different depending on the position along a circumference of the inner body. As a result, the gap between the inner surface and the outer tubular body is different along the circumference of the inner body. When the inner body rotates relative to the outer tubular body, and the product flows through the a varying gap. Due to the variation of the gap along the circumference of the inner body, the product is brought in a more turbulent flow. Because of the more turbulent flow, there is more heat exchange between the product and the heat carrier liquid.

The non-circular shape of the cross-section of the inner surface is for example square or rectangular or hexagonal or octagonal. The non-circular shape of the inner surface is for example rotational symmetric. The inner surface is for example provided with protrusions and/or grooves extending along the longitudinal direction of the inner surface. For example, the inner surface is a cylindrical surface provided with a plurality of protrusions and/or grooves that are arranged at a distance from each other along the circumference of the cylindrical surface. The grooves and/or protrusions extend along the entire length of the inner surface or extend only along a part of the length of the inner surface. For example, the protrusions and/or groves form a corrugated shape on the inner surface. The corrugated shape provides a shape that improves the turbulence of the product, while the shape allows for easy cleaning. In another example, the non-circular shape is formed by a helically shaped element on the inner surface. The helically shaped improves the turbulence of the product, while providing additional pressure on the product to prevent sticking of the product in the gap.

By rotating the inner body and the second channel relative to the outer tubular body and the first channel, the product is in contact with two surfaces at different speeds. Because the two surfaces, i.e., the inner surface of the outer tubular body and the outer surface of the inner body, are moving relatively to each other, the product is less likely to stick to the inner surface and/or the outer surface. Especially, when the gap between the inner surface and the outer surface is small, for example in the range of 1-5 mm, preferably in the range of 1-2 mm, such as 1.5 mm, sticking of the product is reduced or prevented by rotating the inner body and the second channel relative to the outer tubular body and the first channel. If such a gap in a known heat exchanger is partly blocked by sticking product, it is difficult to clean. Cleaning liquid has the tendency to move around the blockage in the gap. By rotating the inner body and the second channel relative to the outer tubular body and the first channel, such blockages are prevented, because there are no residues that stick to both the inner surface as well as the outer surface. Any residues are more easily removed by the cleaning liquid. The invention is particularly useful for ultra-high temperature processing (UHT) in which food is sterilized at a temperature of about 135° C.-140° C. The food product needs to have this temperature just a few seconds to kill bacteria in the product, but should be cooled as soon as possible to prevent degradation of the product, such as loss of flavor, color change etc. By minimizing the gap between the inner surface and the outer surface, the time that a product remains above 100° C. after UHT is minimized.

In an embodiment, the inner surface of the outer tubular body has a first helically shaped element.

In this embodiment, the inner surface has a helically shaped element. Preferably, the helically shaped element extends along the majority or all of the inner surface of the outer tubular body. The helically shaped element is for example a protrusion that extends out of the inner surface. The helically shaped element is for example a curvature of the inner surface. The helically shaped element is for example a recess created in the inner surface or the outer surface.

A pump is provided to push the product through the gap along the second flow path. By providing the inner surface with the helically shaped element, the flow of the product along the inner surface is disturbed, causing the flow of the product to become turbulent. A smooth inner surface without the helically shaped element would have caused the flow of the product to be laminar. The turbulent flow of the product results in a better heat transfer between the product and the inner surface.

In an embodiment, the outer surface of the inner body has a second helically shaped element.

In this embodiment, the outer surface has a helically shaped element. Preferably, the helically shaped element extends along the majority or all of the outer surface of the inner body. The helically shaped element is for example a protrusion that extends out of the outer surface. The helically shaped element is for example a curvature of the outer surface. The helically shaped element is for example a recess created in the outer surface.

A pump is provided to push the product through the gap along the second flow path. By providing the outer surface with the helically shaped element, the flow of the product along the outer surface is disturbed, causing the flow of the product to become turbulent. A smooth outer surface without the helically shaped element would have caused the flow of the product to be laminar. The turbulent flow of the product results in a better heat transfer between the product and the outer surface.

Because of the turbulent flow, more of the product comes into contact with the inner surface and outer surface than if the product was in a laminar flow. As a result, the turbulent flow improves the heat transfer between the product and the heat carrier liquid. Even high-viscosity products can flow turbulent, if the proper parameters of the heat exchanger are selected. Examples of such parameters are the size of the gap between the inner body and the outer tubular body, the rotational speed of the inner body relative to the outer tubular body, and/or the dimensions of the helically shaped elements. The product is in a turbulent flow near the inner surface and/or near the outer surface. Depending on the parameters mentioned above, the product is in a turbulent flow across the gap.

When rotating the inner body relative to the outer tubular body, the helically shaped element creates a pressure on the product. This pressure is created in an embodiment having only the first helically shaped element, and having both the first helically shaped element and the second helically shaped element. The pressure created by the rotation of the inner body relative to the outer tubular body helps the pump to push the product through the heat exchanger.

In an embodiment, the first helically shaped element and the second helically shaped element each have a longitudinal axis parallel to each other. For example, the inner body is a tube or a rod extending in a longitudinal axis. The second helically shaped element is arranged along the circumferential surface of the tube. The axis of the helix of the second helically shaped element is aligned with the longitudinal axis of the inner body. The inner body is arranged inside a space in the outer tubular body. The space extends in a direction parallel to the longitudinal direction of the inner body. The space has the inner surface on which the first helically shaped element is arranged. The axis of the helix of the first helically shaped element is parallel with the longitudinal axis of the inner body.

In an embodiment, the first helically shaped element and the second helically shaped element are helically shaped in the same direction.

A helix can be either left-handed or right-handed. Left-handed and right-handed are in opposite direction of each other. If an observer looks along the axis of a helix, and a clockwise screwing motion moves the helix away from the observer, the helix is right-handed. If an observer looks along the axis of a helix, and a clockwise screwing motion moves the helix towards the observer, the helix is left-handed. Similarly, the first and second helically elements are both right-handed or both left-handed. It has an advantage that the first helically shaped element and the second helically shaped element are helically shaped in the same direction, because this helps to ensure that all of the product in the heat exchanger keeps on flowing, independently of the flow speed of the product and the rotational speed of the inner body relatively to the outer tubular body. This embodiment is especially suited for if the product has a low viscosity, e.g., in the range of 2-100 cP.

In an embodiment, the first helically shaped element and the second helically shaped element are helically shaped in an opposite direction. By arranging the helically shaped elements in opposite directions, rotating the inner body relative to the outer tubular body provides an additional pressure on the product to push the product through the heat exchanger. This embodiment is especially suited for products with a high viscosity, e.g., in the range of 100-500 cP and higher.

In a further embodiment, the inner body is provided with two helically shaped elements which are arranged in opposite directions from each other. For example, the inner body is provided with both a left-handed helically shaped element and a right-handed helically shaped element. The helically shaped elements cross each other on the inner body. In yet another embodiment, the outer tubular body is provided with two helically shaped elements which are arranged in opposite directions from each other. For example, the outer tubular body is provided with both a left-handed helically shaped element and a right-handed helically shaped element.

The helically shaped elements cross each other on the outer tubular body. This embodiment creates additional turbulence in the flow of the product.

In an embodiment, the second helically shaped element is helically shaped in a first direction. The inner body is rotatable relative to the outer tubular body in a second direction opposite to the first direction. In an example, the inner body is provided with a helically shaped element that is right-handed, and the heat exchanger is arranged to rotate the inner body clockwise along the second flow path relative to the outer tubular body. Rotating the inner body in this direction causes an increased turbulent flow, which is beneficial when processing products with a high viscosity, for example of more than 100 cP or more than 200 cP or more than 500 cP. In addition, the increased turbulent flow is useful for mixing product, regardless of its viscosity. For example, two ingredients of the product are provided via the second inlet and those two ingredients have different temperatures. The heat exchanger according to this embodiment does not only bring the ingredients to the desired temperature, it also helps to create a homogenous product in which the two ingredients are properly divided in the product.

In an embodiment, at least one of the first helically shaped element and the second helically shaped element is formed by a corrugated shape of respectively the inner surface and/or the outer surface. The helically shaped elements are formed by twisting the inner surface and/or the outer surface to create a helically corrugated shape. The corrugated shape is a curved surface. The angle of the corrugated shape is, for example, in the range of 15°-45°, for example 30°. The corrugated shape has a depth, for example, in the range of 5-100 mm. The grooves in the corrugated shape are, for example, rounded with a radius in the range of 1-10 mm.

In an embodiment, at least one of the first helically shaped element and the second helically shaped element comprises a thread. The thread extends out of the first or outer surface. The type of thread is, for example, vee thread or square thread or acme thread or buttress thread. The thread is a single-start thread or a multi-start thread. The angle of the thread is, for example, in the range of 15°-45°, for example 30°. The thread extends out of the first or outer surface, for example, in the range of 5-100 mm. In an embodiment, the thread is rolled or machined from the inner body. In an embodiment, the thread is rolled or machined from the outer tubular body.

In an embodiment, at least one of the first helically shaped element and the second helically shaped element comprises a groove. In this embodiment, the helically shaped element is formed by providing a groove, for example in the inner body. The inner body is rolled and plastically deformed to create the groove. In an embodiment, the inner body is a tube that is rolled to create the groove on the outer surface. Alternatively, the inner body is a tube in which the groove is cut, for example by milling. In an embodiment, the inner surface has a single groove or multiple grooves. In an embodiment, the outer surface has a single groove or multiple grooves. The angle of the groove is, for example, in the range of 15°-45°, for example 30°. The groove has a depth, for example, in the range of 5-100 mm. The edges of the groove are, for example, rounded with a radius in the range of 1-10 mm.

The helically shaped element on the inner body is formed by deforming the inner body or by adding the helically shaped element to the inner body. Deforming the inner body, for example by rolling, has the advantage that a smooth transition between the outer surface of the inner body and the helically shaped element can be formed. The smooth transition allows for proper cleaning of the inner body, which is important, for example, when the product is a food product. Adding the helically shaped element to the inner body, for example by welding helically shaped material to the inner body, is a cost-effective way to build a large scale heat exchanger, for example for processing manure or waste. In such implementations, it is less of importance whether small bits of product remain in the transition area between the outer surface of the inner body and the helically shaped element connected to the outer surface.

In an embodiment, the inner body is elongated along an axis. The inner body is rotatable relative to the outer body along the axis. For example, the inner body is a tube or a rod extending along the axis. The axis is the longitudinal axis of the tube. The outer surface is the circumferential surface of the tube. The end surfaces of the tube are sealed to prevent contact between the end surfaces and the product. The circumferential surface is smooth or is provided with the helically shaped element. The inner body is rotatable along the longitudinal axis, so the position of the longitudinal axis remains stationary relative to the outer tubular body, while the inner body rotates relative to the outer tubular body. In this embodiment, an arrangement of the bearings that couple the inner body and the outer tubular body with each other is relatively simple. The bearings allow rotation of the inner body relative to the outer body along the longitudinal axis and constrain the inner body relative to the outer body in the other degrees of freedom.

In another embodiment, the inner body is elongated along an axis. The inner body is rotatable by moving the axis in a plane perpendicular to the axis. For example, the inner body is a tube or a rod extending along the axis. The axis is the longitudinal axis of the tube. The outer surface is the circumferential surface of the tube. The end surfaces of the tube are sealed to prevent contact between the end surfaces and the product. The circumferential surface is smooth or is provided with the helically shaped element. The inner body is rotatable by moving the axis in the plane perpendicular to the axis. By moving the axis in the plane perpendicular to the axis, the inner body is moved in the plane perpendicular to the axis. The movement of the inner body causes the gap between the inner body and the outer tubular body to decrease locally on one side of the inner body, for example the left side, and simultaneously to increase the gap on the opposite side, for example the right side. By moving the inner body back and forth in the plane perpendicular to the axis, pressure is applied to the product in the gap to push the product forward, preventing the product to stick on the first or outer surface and to create residue.

In a further embodiment thereof, the inner body is rotatable by moving the axis along a circular path in the plane perpendicular to the axis. This movement is comparable with a planetary movement in which the inner body rotates along a center point without rotating the inner body itself along its own axis. To evenly divide the pressure along the first and outer surfaces, the axis is moved along a circular path in the plane perpendicular to the axis. By moving the axis along the circular path, the pressure is applied at a part of circumference of the first and outer surfaces at a time. When the axis has completed the circular path, the pressure was applied along the complete circumference of the first and outer surfaces. In yet another embodiment, instead of a circular path, any other elliptical path is applied.

To rotate the inner body relative to the outer tubular body, bearings are provided to couple the inner body and the outer tubular body to each other. The bearings are arranged near one or both ends of the inner body. The bearings need to be properly separated from the product to prevent grease or oil or metal particles to contaminate the product. In an embodiment, a seal is provided between the inner surface of the outer tubular body and the outer surface of the inner body. The seal separates the product from the bearings. The seal allows the inner body to rotate relative to the outer tubular body. For example, the seal is fixed to the outer tubular body. A surface of the seal is in contact with the inner body. When the inner body rotates relative to the outer tubular body, the inner body slides along the surface of the seal that is in contact with the inner body.

In an embodiment a bellow is attached to the inner body and the outer tubular body and arranged to create a seal between the outer surface and the inner surface. The bellow is provided to create a seal that separates the bearings from the product. The bellow is able to allow the rotation of the inner body relative to the outer tubular body when the axis moves along in the plane perpendicular to the axis. During this rotation, the bellow is elastically deformed. One end of the bellow is fixed to the inner body, and the other end of the bellow is fixed to the outer tubular body. The combination of the bellow with the movement of the axis in the plane perpendicular to the axis has the advantage that no sliding seal is required. With a sliding seal, the inner body would move relative to the sliding seal, causing the seal to slide over the inner body. Product would form a residue in between the sliding seal and the inner body, which requires additional cleaning to remove the residue. By using the bellow, no sliding between the inner body and the bellow occurs.

In an embodiment, the heat exchanger is a counter-flow heat exchanger. The first flow path and the second flow path are in opposite directions. In this embodiment, the hottest part of the product in the second flow path is near the hottest part of the heat carrier liquid in the first flow path, whereas the coolest part of the product in the second flow path is near the coolest part of the heat carrier liquid in the first flow path. As a result, along the second flow path, the product is always near a part of the heat carrier liquid that has a proper temperature difference with the product. Alternatively, the heat exchanger is a parallel flow heat exchanger. In a parallel flow heat exchanger, the first flow path and the second flow path are in the same direction. The final temperature of a product is typically more accurately determined when using a parallel flow heat exchanger instead of a counter-flow heat exchanger.

In a further aspect of the invention, the heat exchanger is used to exchange heat with the second fluid that has a viscosity of more than 20 cP. Preferably, the viscosity is more than 100 cP. More preferably, the viscosity is more than 500 cP. According to this aspect, the heat exchanger is used to process a fluid product with a high viscosity. Products with such high viscosity require a high pressure to push through a known heat exchanger. Such products also stick easily inside a known heat exchanger, which results in a residue that needs to be removed. By processing a fluid product with such a high viscosity with the heat exchanger according to the invention, the amount of residue is reduced or even prevented. Also, the pressure created by the rotation of the inner body relative to the outer tubular body helps for the fluid product to flow through the heat exchanger. The viscosity typically depends on the temperature of the product. A lower temperature typically leads to a higher value for the viscosity, i.e., the product becomes 'thicker' at lower temperatures. The viscosity of the product is, for example, more than 500 cP only near the second inlet or more than 500 cP only near the second outlet.

Other properties of the product cause difficulties in processing a product in a known heat exchanger. For example, when pasteurizing egg, as a fluid. The temperature at which egg is typically pasteurized is near the temperature of 65-66° C. at which egg starts to coagulate. When processing egg with the heat exchanger according to the invention, the build-up of coagulated egg is reduced or prevented. Only small parts of coagulated egg are present in the fluid, which does not reduce the quality of the product. Also, because to the turbulent flow, the heat carrier liquid is set at a lower temperature than in the known heat exchanger. Even at the lower temperature, the egg reaches the desired pasteurization temperature. The lower temperature reduces the chance of the egg coagulating. As a result, the heat exchanger is able to be operated much longer before cleaning is necessary.

In an embodiment, the heat exchanger is used to exchange heat with the second fluid, which is a food product. There are many products that are cooled or heated when they are in a fluid-state. To have a high-quality product, it is important that the heat exchange with the product takes place within a desired time and that all of the food product is able to exchange heat. For example, improper heat exchange with dark chocolate in a fluid-state results in a white layer or white spots on the finished cooled product. By using the heat exchanger according to the invention, the heat exchange with the product is more predictable.

In an embodiment, the heat exchanger is used to exchange heat with the second fluid, which is a non-food product. Although the description above describes the second fluid as a product, in an embodiment the second fluid is a non-food product, such as a chemical product. In an embodiment, the chemical product has a high viscosity, for example more than 500 cP. The chemical product is, for example, paint or an oil product or a polymer. The non-food product is a liquid, a combination of a liquid and solids, a combination of a liquid, solids and gas. In an embodiment, the non-food product is a granular material. Granular material, such as sand and fertilizer, can flow like a fluid, even though the granular material is made from small-sized solids.

In a second aspect of the invention, improved heat transfer is achieved by a heat exchanger adapted to exchange heat between a first fluid and a second fluid. The heat exchanger comprises:

an outer tubular body having an inner surface;

an inner body arranged inside the outer tubular body and having an outer surface facing the inner surface of the outer tubular body, leaving free a gap between the inner surface of the outer tubular body and the outer surface of the inner body;

a first inlet and a first outlet arranged to provide a first flow path for the first fluid from the first inlet to the first outlet via a first channel and via a second channel;

a second inlet and a second outlet arranged to provide a second flow path from the second inlet to the second outlet for the second fluid via the gap between the inner surface of the outer tubular body and the outer surface of the inner body, wherein the outer tubular body comprises the first channel, wherein the inner body comprises the second channel, wherein the inner body is rotatable relative to the outer tubular body, wherein the inner body is elongated along an axis, wherein the inner body is rotatable by moving the axis in a plane perpendicular to the axis.

The heat exchanger is adapted to exchange heat between a first fluid and a second fluid. The first fluid is, for example, a heat carrier liquid, such as water, a thermal oil, brine or glycol. Different types of fluids can be used. In an example, the first fluid is in a completely liquid-state. However, the first fluid does not need to be completely in a liquid-state. For example, the first fluid may contain a liquid and gas. For example, the first fluid comprises ammonia in a liquid phase and in a gas phase. During use, the ammonia transfers heat by changing the mass ratio between the liquid phase and the gas phase. An example of gas is carbon dioxide that is present in the first fluid to achieve a desired acidity with a desired pH-value of the first fluid. The gas can be dissolved in the first fluid or can be present in the first fluid in a gaseous-state so the gas forms bubbles in the first fluid. In view of explaining the invention, the first fluid is further indicated with the expression "heat carrier liquid".

The second fluid is, for example, a food product, such as a high-viscosity food fluid. The second fluid is a liquid, a combination of liquid and solids, a combination of liquid and gas, or a combination of liquid, solids and gas. For example, if the food product is a fruit juice, the second fluid can include pulp and seeds. If the food product is butter, the butter can be heated to a completely liquid state. The food product is, for example, food for animals, which is typically referred to as feed product or animal feed product. In an example, the second fluid behaves viscoelastic. The second fluid is, for example, a non-food product. A non-food product is, for example, a chemical product, such as a petro-chemical product or paint. The non-food product is, for example, fertilizer or a polymer. In all these examples, the second fluid has the property that it can flow. In view of explaining the invention, the second fluid is further indicated with the expression "product".

The outer tubular body is for example an elongated hollow body. Inside the outer tubular body, the inner body is arranged. A gap is defined between by the outer surface of the inner body and the inner surface of the outer tubular body. The gap is a space between the outer tubular body and the inner body. The product follows a flow path from an inlet to an outlet via the gap between the inner body and the outer tubular body. The inlet and the outlet are in communication with each other via the gap. Optionally, a pump is provided to push the product through the gap between the inner body and the outer tubular body.

An inlet and an outlet are provided for the heat carrier liquid to flow through the outer tubular body and the inner body. The outer tubular body has at least one channel and the inner body has at least one channel through which the heat carrier liquid flows via the first flow path. Heat is exchanged between the product and the outer tubular body and heat is exchanged between the product and the inner body. The first flow path is provided through the channel arranged in the outer tubular body and through the channel arranged in the inner body. The first flow path is arranged in both the outer tubular body and the inner body. A part of the first flow path is via the first channel through the outer tubular body. The first channel in the outer tubular body is in communication with the first inlet and the first outlet. The heat carrier liquid flows from the first inlet via the first channel in the outer tubular body to the first outlet. The first channel is for example arranged in a wall of the outer tubular body. Another part of the first flow path is via the second channel through the inner body. The second channel in the inner body is in communication with the first inlet and the first outlet. The heat carrier liquid flows from the first inlet via the second channel in the inner body to the first outlet. The first channel and the second channel are arranged parallel to each other or in series. The second inlet and the second outlet are arranged to provide the second flow path for the second fluid in the gap between the inner surface and the outer surface to exchange heat with the first fluid via both the inner surface and the outer surface.

The inner body is rotatable relative to the outer tubular body. In an embodiment, the outer tubular body is stationary, and the inner body is rotatable. When the inner body rotates, the second channel rotates along with the inner body. In an embodiment, the inner body is stationary and the outer tubular body is rotatable around the inner body. When the outer body rotates, the first channel rotates along with the outer tubular body. In another embodiment, both the outer tubular body and the inner body rotate, each at a different rotational speed.

By providing the first channel and the second channel in respectively the outer tubular body and the inner body, two heat transfer paths are created to exchange heat between the product and the heat carrier liquid. One heat transfer path is via the outer tubular body. The other heat transfer path is via the inner body. The heat carrier liquid exchanges heat with the product via the outer surface and via the inner surface. The channels in the outer tubular body and the inner body receive the heat carrier liquid via a common inlet or via separate inlets on the heat exchanger. By providing the two heat transfer paths, the contact area of the heat exchanger with the product is enlarged, and as a result, the heat exchange is improved.

The inner body and the second channel together form a combined body that is rotatable relative to the outer tubular body and the first channel. The outer tubular body and the first channel together form a further combined body. Because inner body and the second channel together form the combined body, and because outer tubular body and the first channel together form the further combined body, less seals are required to separate the product and the heat carrier liquid. Reducing the number of seals, reduces the chance for a leakage of the product or the heat carrier liquid.

By rotating the inner body and the second channel relative to the outer tubular body and the first channel, the product is in contact with two surfaces at different speeds. Because the two surfaces, i.e., the inner surface of the outer tubular body and the outer surface of the inner body, are moving relatively to each other, the product is less likely to stick to the inner surface and/or the outer surface. Especially, when the gap between the inner surface and the outer surface is small, for example in the range of 1-5 mm, preferably in the range of 1-2 mm, such as 1.5 mm, sticking of the product is reduced or prevented by rotating the inner body and the second channel relative to the outer tubular body and the first channel. If such a gap in a known heat exchanger is partly blocked by sticking product, it is difficult to clean. Cleaning liquid has the tendency to move around the blockage in the gap. By rotating the inner body and the second channel relative to the outer tubular body and the first channel, such blockages are prevented, because there are no residues that stick to both the inner surface as well as the outer surface. Any residues are more easily removed by the cleaning liquid. The invention is particularly useful for ultra-high temperature processing (UHT) in which food is sterilized at a temperature of about 135° C.-140° C. The food product needs to have this temperature just a few seconds to kill bacteria in the product, but should be cooled as soon as possible to prevent degradation of the product, such as loss of flavor, color change etc. By minimizing the gap between the inner surface and the outer surface, the time that a product remains above 100° C. after UHT is minimized.

For example, the inner body is a tube or a rod extending along the axis. The axis is the longitudinal axis of the tube. The outer surface is the circumferential surface of the tube. The end surfaces of the tube are sealed to prevent contact between the end surfaces and the product. The circumferential surface is smooth or is provided with the helically shaped element. The inner body is rotatable by moving the axis in the plane perpendicular to the axis. By moving the axis in the plane perpendicular to the axis, the inner body is moved in the plane perpendicular to the axis. The movement of the inner body causes the gap between the inner body and the outer tubular body to decrease locally on one side of the inner body, for example the left side, and simultaneously to increase the gap on the opposite side, for example the right side. By moving the inner body back and forth in the plane perpendicular to the axis, pressure is applied to the product in the gap to push the product forward, preventing the product to stick on the first or outer surface and to create residue.

In an embodiment, the inner body is rotatable by moving the axis along a circular path in the plane perpendicular to the axis.

According to this embodiment, this movement is comparable with a planetary movement in which the inner body rotates along a center point without rotating the inner body itself along its own axis. To evenly divide the pressure along the first and outer surfaces, the axis is moved along a circular path in the plane perpendicular to the axis. By moving the axis along the circular path, the pressure is applied at a part of circumference of the first and outer surfaces at a time. When the axis has completed the circular path, the pressure was applied along the complete circumference of the first and outer surfaces. In yet another embodiment, instead of a circular path, any other elliptical path is applied.

To rotate the inner body relative to the outer tubular body, bearings are provided to couple the inner body and the outer tubular body to each other. The bearings are arranged near one or both ends of the inner body. The bearings need to be properly separated from the product to prevent grease or oil or metal particles to contaminate the product. In an embodiment, a seal is provided between the inner surface of the outer tubular body and the outer surface of the inner body. The seal separates the product from the bearings. The seal allows the inner body to rotate relative to the outer tubular body. For example, the seal is fixed to the outer tubular body. A surface of the seal is in contact with the inner body. When the inner body rotates relative to the outer tubular body, the inner body slides along the surface of the seal that is in contact with the inner body.

In an embodiment, the heat exchanger comprises a bellow attached to the inner body and the outer tubular body and arranged to create a seal between the outer surface and the inner surface.

According to this embodiment, the bellow is provided to create a seal that separates the bearings from the product. The bellow is able to allow the rotation of the inner body relative to the outer tubular body when the axis moves along in the plane perpendicular to the axis. During this rotation, the bellow is elastically deformed. One end of the bellow is fixed to the inner body, and the other end of the bellow is fixed to the outer tubular body. The combination of the bellow with the movement of the axis in the plane perpendicular to the axis has the advantage that no sliding seal is required. With a sliding seal, the inner body would move relative to the sliding seal, causing the seal to slide over the inner body. Product would form a residue in between the sliding seal and the inner body, which requires additional cleaning to remove the residue. By using the bellow, no sliding between the inner body and the bellow occurs.

In an embodiment, the inner surface of the outer tubular body has a first helically shaped element.

According to this embodiment, the inner surface has a helically shaped element. Preferably, the helically shaped element extends along the majority or all of the inner surface of the outer tubular body. The helically shaped element is for example a protrusion that extends out of the inner surface. The helically shaped element is for example a curvature of the inner. The helically shaped element is for example a recess created in the inner surface or the outer surface.

In an embodiment, the outer surface of the inner body has a second helically shaped element.

According to this embodiment the outer surface has a helically shaped element. Preferably, the helically shaped element extends along the majority or all of the outer surface of the inner body. The helically shaped element is for example a protrusion that extends out of the outer surface. The helically shaped element is for example a curvature of the outer surface. The helically shaped element is for example a recess created in the outer surface.

A pump is provided to push the product through the gap along the second flow path. By providing the inner surface and/or the outer surface with the helically shaped element, the flow of the product along the inner surface and/or outer surface is disturbed, causing the flow of the product to become turbulent. A smooth surface without the helically shaped element would have caused the flow of the product to be laminar. The turbulent flow of the product results in a better heat transfer between the product and the inner surface.

Because of the turbulent flow, more of the product comes into contact with the inner surface and outer surface than if the product was in a laminar flow. As a result, the turbulent flow improves the heat transfer between the product and the heat carrier liquid. Even high-viscosity products can flow turbulent, if the proper parameters of the heat exchanger are selected. Examples of such parameters are the size of the gap between the inner body and the outer tubular body, the rotational speed of the inner body relative to the outer tubular body, and/or the dimensions of the helically shaped elements. The product is in a turbulent flow near the inner surface and/or near the outer surface. Depending on the parameters mentioned above, the product is in a turbulent flow across the gap.

In an embodiment, the inner surface extends along a longitudinal axis. A cross-section of the inner surface perpendicular to the longitudinal axis is non-circular.

In an embodiment, the inner surface of the outer tubular body has a first helically shaped element, wherein the outer surface of the inner body has a second helically shaped element, and wherein the first helically shaped element and the second helically shaped element each have a longitudinal axis parallel to each other.

According to this embodiment, for example, the inner body is a tube or a rod extending in a longitudinal axis. The second helically shaped element is arranged along the circumferential surface of the tube. The axis of the helix of the second helically shaped element is aligned with the longitudinal axis of the inner body. The inner body is arranged inside a space in the outer tubular body. The space extends in a direction parallel to the longitudinal direction of the inner body. The space has the inner surface on which the first helically shaped element is arranged. The axis of the helix of the first helically shaped element is parallel with the longitudinal axis of the inner body.

In an embodiment, the first helically shaped element and the second helically shaped element are helically shaped in the same direction.

According to this embodiment, a helix can be either left-handed or right-handed. Left-handed and right-handed are in opposite direction of each other. The first and second helically elements are both right-handed or both left-handed. It has an advantage that the first helically shaped element and the second helically shaped element are helically shaped in the same direction, because this helps to ensure that all of the product in the heat exchanger keeps on flowing, independently of the flow speed of the product and the rotational speed of the inner body relatively to the outer tubular body. This embodiment is especially suited for if the product has a low viscosity, e.g., in the range of 2-100 cP.

In an embodiment, the first helically shaped element and the second helically shaped element are helically shaped in an opposite direction.

According to this embodiment, by arranging the helically shaped elements in opposite directions, rotating the inner body relative to the outer tubular body provides an additional pressure on the product to push the product through the heat exchanger. This embodiment is especially suited for products with a high viscosity, e.g., in the range of 100-500 cP and higher.

In an embodiment, the second helically shaped element is helically shaped in a first direction, and the inner body is rotatable relative to the outer tubular body in a second direction opposite to the first direction.

According to this embodiment, in an example, the inner body is provided with a helically shaped element that is right-handed, and the heat exchanger is arranged to rotate the inner body clockwise along the second flow path relative to the outer tubular body. Rotating the inner body in this direction causes an increased turbulent flow, which is beneficial when processing products with a high viscosity, for example of more than 100 cP or more than 200 cP or more than 500 cP. In addition, the increased turbulent flow is useful for mixing product, regardless of its viscosity. For example, two ingredients of the product are provided via the second inlet and those two ingredients have different temperatures. The heat exchanger according to this embodiment does not only bring the ingredients to the desired temperature, it also helps to create a homogenous product in which the two ingredients are properly divided in the product.

In an embodiment, at least one of the first helically shaped element and the second helically shaped element is formed by a corrugated shape of respectively the inner surface and/or the outer surface.

According to this embodiment, the helically shaped elements are formed by twisting the inner surface and/or the outer surface to create a helically corrugated shape. The corrugated shape is a curved surface. The angle of the corrugated shape is, for example, in the range of 15°-45°, for example 30°. The corrugated shape has a depth, for example, in the range of 5-100 mm. The grooves in the corrugated shape are, for example, rounded with a radius in the range of 1-10 mm.

In an embodiment, at least one of the first helically shaped element and the second helically shaped element comprises a thread.

According to this embodiment, the thread extends out of the first or outer surface. The type of thread is, for example, vee thread or square thread or acme thread or buttress thread. The thread is a single-start thread or a multi-start thread. The angle of the thread is, for example, in the range of 15°-45°, for example 30°. The thread extends out of the first or outer surface, for example, in the range of 5-100 mm. In an embodiment, the thread is rolled or machined from the inner body. In an embodiment, the thread is rolled or machined from the outer tubular body.

In an embodiment, at least one of the first helically shaped element and the second helically shaped element comprises a groove.

According to this embodiment, the helically shaped element is formed by providing a groove, for example in the inner body. The inner body is rolled and plastically deformed to create the groove. In an embodiment, the inner body is a tube that is rolled to create the groove on the outer surface. Alternatively, the inner body is a tube in which the groove is cut, for example by milling. In an embodiment, the inner surface has a single groove or multiple grooves. In an embodiment, the outer surface has a single groove or multiple grooves. The angle of the groove is, for example, in the range of 15°-45°, for example 30°. The groove has a depth, for example, in the range of 5-100 mm. The edges of the groove are, for example, rounded with a radius in the range of 1-10 mm.

In an embodiment, the inner body is rotatable relative to the outer tubular body along the axis.

According to this embodiment, the inner body does not only rotate relative to the outer tubular body by moving through a plane perpendicular to the axis, but also rotates along the axis.

In an embodiment, the heat exchanger is a counter-flow heat exchanger. The first flow path and the second flow path are in opposite directions.

According to this embodiment, the hottest part of the product in the second flow path is near the hottest part of the heat carrier liquid in the first flow path, whereas the coolest part of the product in the second flow path is near the coolest part of the heat carrier liquid in the first flow path. As a result, along the second flow path, the product is always near a part of the heat carrier liquid that has a proper temperature difference with the product.

In a further aspect of the invention, the heat exchanger is, in an embodiment, used with the second fluid that has a viscosity of more than 20 cP, preferably more than 100 cP, more preferably more than 500 cP. In another embodiment, the heat exchanger is used with the second fluid that is a food product or a feed product. In yet another embodiment, the heat exchanger is used with the second fluid that is a non-food product.

Figure 2:
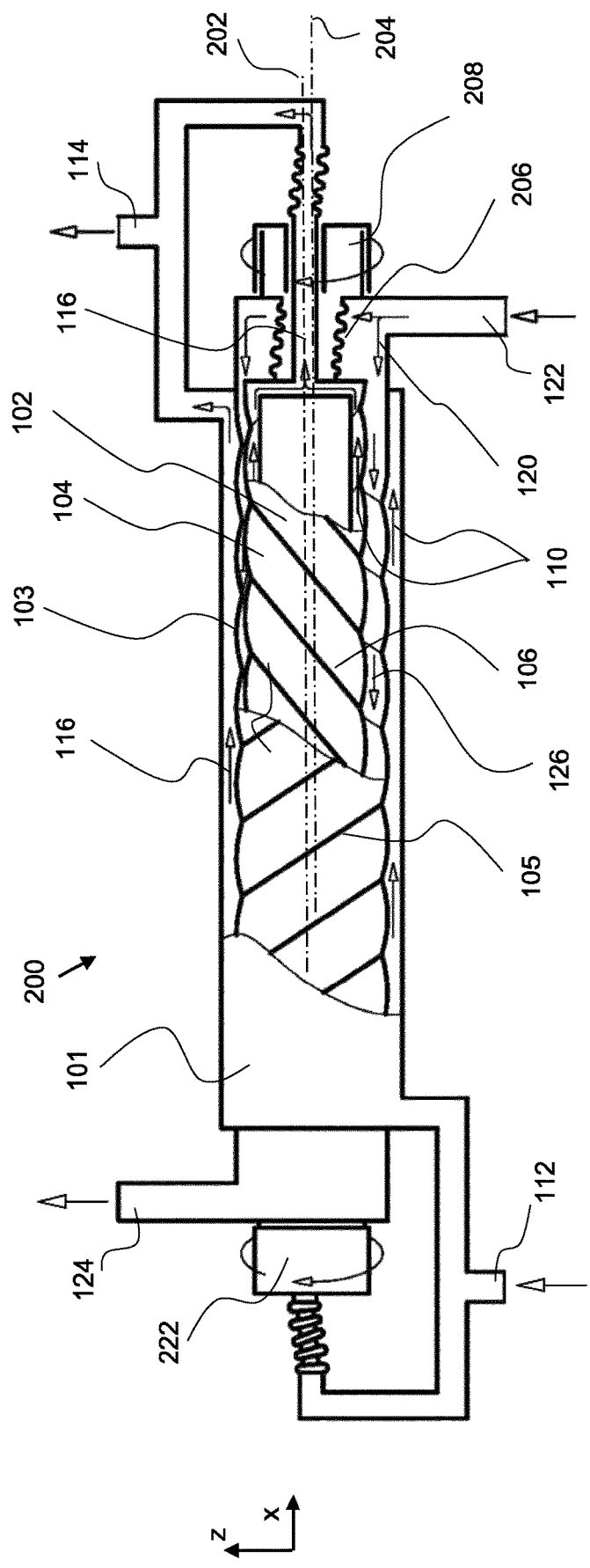
Figure 3:
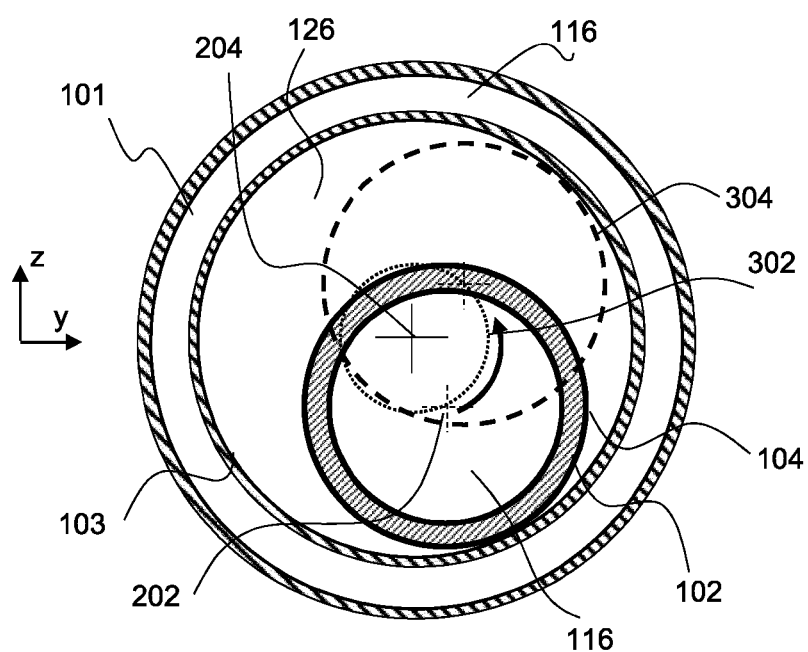

The invention will be described in more detail below under reference to the drawing, in which in a non-limiting manner exemplary embodiments of the invention will be shown. The drawing shows in:

FIG. 1: a heat exchanger according to an embodiment of the invention,

FIG. 2: a heat exchanger according to a further embodiment of the invention, FIG. 3: a movement path of the inner body of the heat exchanger of FIG. 2, FIGS. 4-9: details of yet further embodiments of the invention.

FIG. 1 shows a heat exchanger 100 according to an embodiment of the invention. FIG. 1 shows a partial view of the inside of the heat exchanger 100. The heat exchanger 100 is for exchanging heat between a first fluid 110 and a second fluid 120. The heat exchanger 100 comprises an outer tubular body 101, an inner body 102, a first inlet 112, a second inlet 122, a first outlet 114 and a second outlet 124. The outer tubular body 101 has an inner surface 103. The inner body 102 is arranged inside the outer tubular body 101 and has an outer surface 104. The outer surface 104 faces the inner surface 103. The first inlet 112 and the first outlet 114 are arranged to provide a first flow path 116 for the first fluid 110 via a first channel in the outer tubular body 101 and via a second channel in the inner body 102. The second inlet 122 and the second outlet 124 are arranged to provide a second flow path 126 for the second fluid 120 in between the inner surface 103 and the outer surface 104 to exchange heat with the first fluid via the inner surface 103 and the outer surface 104. The inner body 102 is rotatable relative to the outer tubular body 101. The first channel is arranged in the outer tubular body 101. The second channel is arranged in the inner body 102.

The inner surface 103 has a first helically shaped element 105. The outer surface 104 has a second helically shaped element 106.

The inner body 102 is extending along the x-axis, which is the longitudinal axis of the inner body 102. The inner body 102 is rotatable along the longitudinal axis.

The first fluid 110 is the heat carrier liquid, for example water or steam. The first fluid 110 is hot if the second fluid 120 needed heating. The first fluid 110 is cold if the second fluid 120 needs cooling.

The second fluid 120 is the product that is being processed. The second fluid 120 is pumped to the heat exchanger 100 either to be heated or to be cooled.

The first fluid 110 follows first flow path 116 through the heat exchanger 100 from the first inlet 112 via the first channel and via the second channel to the first outlet 114. As shown in FIG. 1, the first fluid 110 flows through the outer tubular body 101 via the first channel as well as through the inner body 102 via the second channel. In the outer tubular body 101, the first fluid 110 flows through the first channel that is in thermal contact with the inner surface 103. Via the inner surface 103, the first fluid 110 exchanges heat with the second fluid 120. In the inner body 102, the first fluid 110 flows through the second channel that is in thermal contact with the outer surface 104. Via the outer surface 104, the first fluid 110 exchanges heat with the second fluid 120. In an embodiment, the first fluid 110 flows through only one of the outer tubular body 101 and the inner body 102.

The second fluid 120 follows the second flow path 126 through the heat exchanger 100 from the second inlet 122 to the second outlet 124. The second flow path 126 is in the gap between the inner surface 103 and the outer surface 104. In this embodiment, the inner surface 103 and the outer surface 104 are substantially cylindrically shaped. As a result, a cross-section of gap between the inner surface 103 and the outer surface 104 perpendicular to the x-axis is substantially ring shaped.

As indicated by the arrows, the first flow path 116 is in the +x-direction, whereas the second flow path 126 is in the −x-direction. So the first flow path 116 in a direction opposite to the second flow path 126. In this embodiment, the heat exchanger 100 is a counter-flow heat exchanger. This has the following advantage. In case the heat exchanger 100 is used to heat the second fluid 120, the first fluid 110 has the highest temperature near the first inlet 112. The temperature of the first fluid 110 reduces as the first fluid 110 proceeds to the first outlet 114, because heat is transferred away from the first fluid 110 to the second fluid 120. So the first fluid 110 has the lowest temperature near the first outlet 114. By providing the first flow path 116 in a direction opposite to the second flow path 126, the second fluid 120 near the second inlet 122 is also near the first outlet 114. The second fluid 120 near the first outlet 114 has the lowest temperature, because at that location, the second fluid 120 has just entered the heat exchanger 100. So even with the low temperature of the first fluid 110 at that location, there is still a proper difference in temperature between the first fluid 110 and the second fluid 120. As a result, heat exchange already starts near the second inlet 122. As the second fluid 120 progresses towards the second outlet 124, the second fluid 120 becomes hotter. Because the first inlet 112 is near the second outlet 124, also the first fluid 110 becomes hotter towards the second outlet 124. As a result, a proper difference in temperature between the first fluid 110 and the second fluid 120 in maintained while the second fluid 120 flows via the second flow path 126. Alternatively, the heat exchanger 100 is a parallel-flow heat exchanger in which the first flow path 116 and the second flow path 126 are in the same direction.

As shown in FIG. 1, both the first helically shaped member and the second helically shaped member have a longitudinal axis along the x-axis. The first helically shaped member on the outer tubular body 101 is right-handed, whereas the second helically shaped member on the inner body 102 is left-handed. So the first helically shaped member and the second helically shaped member are helically shaped in opposite directions.

The heat exchanger 100 is used by providing the first fluid 110, i.e., the heat carrier liquid, via the first inlet 112. The first fluid 110 flows via the first flow path 116 towards the first outlet 114. The first fluid 110 flows through the outer tubular body 101 via the first channel and through the inner body 102 via the second channel. The second fluid 120, i.e., the product to be processed, is provided via the second inlet 122. The second fluid 120 flows via the second flow path 126 towards the second outlet 124. The second flow path 126 is in the gap between the inner surface 103 of the outer tubular body 101 and the outer surface 104 of the inner body 102. The second fluid 120 exchanges heat with the first fluid 110 via the inner surface 103 and the outer surface 104.

FIG. 2 shows a heat exchanger 200 according to a further embodiment of the invention. The heat exchanger 200 is for exchanging heat between the first fluid 110 and the second fluid 120. The heat exchanger 200 comprises the outer tubular body 101, the inner body 102, the first inlet 112, the second inlet 122, the first outlet 114 and the second outlet 124. The outer tubular body 101 has the inner surface 103. The inner body 102 is arranged inside the outer tubular body 101 and has the outer surface 104. The outer surface 104 faces the inner surface 103. The first inlet 112 and the first outlet 114 are arranged to provide the first flow path 116 for the first fluid 110 via the outer tubular body 101 and via the inner body 102. The second inlet 122 and the second outlet 124 are arranged to provide the second flow path 126 for the second fluid 120 in between the inner surface 103 and the outer surface 104 to exchange heat with the first fluid 110 via at least one of the inner surface 103 and the outer surface 104. The inner body 102 is rotatable relative to the outer tubular body 101. The inner surface 103 has a first helically shaped element 105. The outer surface 104 has a second helically shaped element 106.

The inner body 102 is extending along a longitudinal axis. The inner body 102 is substantially cylindrically shaped, with the axis of the cylindrical shape being the axis 202. The second helically shaped element 106 is provided to the outer surface of the cylindrically shaped inner body 102. The inner body 102 is arranged inside a space in the outer tubular body 101. The space is formed by the inner surface 103. The first helically shaped element 105 is provided on the inner surface 103. The space is cylindrically shaped with a longitudinal axis 204. As shown in FIG. 2, there is an offset between the axis 202 of the inner body 102 and the axis 204 of the outer tubular body 101. When the inner body 102 is rotated relative to the outer tubular body 101, the axis 202 of the inner body 102 moves in a plane perpendicular to the axis 202. A detail of the rotation of the inner body 102 is shown in FIG. 3. FIG. 3 shows a cross-section of the inner body 102 and the outer tubular body 101. The outer tubular body 101 has the first channel for providing the first flow path 116 through the outer tubular body 101. The inner body 102 has the second channel for providing the first flow path 116 through the inner body 102. The first and second helically shaped elements 105, 106 are not indicated for sake of simplicity of the drawing. The inner body 102 is depicted in an initial position in the lower right part of the space in the outer tubular body 101. When the inner body 102 is rotated relative to the outer tubular body 101, the axis 202 of the inner body 102 is moved along a path in the plane perpendicular to the axis 202 of the inner body 102. This path is indicated by dashed circle 302. The inner body 102 is rotated by moving the axis 202 of the inner body 102 along the dashed circle 302 at an offset with the axis 204 of the outer tubular body 101. In the initial position, the gap between the inner surface 103 and the outer surface 104 below the inner body 102 is smaller than the gap between the inner surface 103 and the outer surface 104 above the inner body 102. The inner body 102 is rotated from the initial position to a further position by moving along the dashed circle 302 in the direction of the arrow. In the further position, the inner body 102 is in the upper right part of the space of the outer tubular body 101. In the further position, the gap between the inner surface 103 and the outer surface 104 above the inner body 102 is smaller than the gap between the inner surface 103 and the outer surface 104 below the inner body 102. By moving the inner body 102 along the dashed circle 302, the second fluid 120 is pushed along the second flow path 126.

During the rotation of the inner body 102 along the dashed circle 302, the inner body 102 does not rotate along its own axis, i.e., along the axis 202 of the inner body 102. So, for example, the upper part of the inner body 102, i.e., the part of the inner body 102 that has the highest z-position, remains the upper part during the rotation of the inner body 102 along the axis 204 of the outer tubular body 101.

When the inner body 102 is being rotated along the axis 204 of the outer tubular body 101, the axis 204 of the outer tubular body 101 and the axis 202 of the inner body 102 remain parallel to each other. In an embodiment, when the inner body 102 is being rotated along the axis 204 of the outer tubular body 101, the axis 204 of the outer tubular body 101 and the axis 202 of the inner body 102 rotate relative to each other along an axis perpendicular to the axis 204 of the outer tubular body 101, i.e., the y-axis, z-axis or a combination of the y-axis and z-axis. In this embodiment, for example, one end of the inner body 102 is moved up along the dashed circle 302, whereas simultaneously, the other end of the inner body 102 is moved down along the dashed circle 302.

The rotation of the inner body 102 along the dashed circle 302 is implemented by using an eccentric mechanisms 208 and 222. The eccentric mechanisms 208 and 222 include bearings to allow the rotation of the inner body 102 relative to the outer tubular body 101, while constraining other movement of the inner body 102 relative to the outer tubular body 101. The eccentric mechanisms 208 and 222 include a motor to drive the rotation of the inner body 102 relative to the outer tubular body 101.

A bellow 206 is attached to the inner body and the outer tubular body. The bellow 206 is arranged to create a seal between the outer surface 104 and the inner surface 103.

The heat exchanger 200 is used by providing the first fluid 110, i.e., the heat carrier liquid, via the first inlet 112. The first fluid 110 flows via the first flow path 116 towards the first outlet 114. The first fluid 110 flows through the outer tubular body 101 and through the inner body 102. The second fluid 120, i.e., the product to be processed, is provided via the second inlet 122. The second fluid 120 flows via the second flow path 126 towards the second outlet. The second flow path 126 is in between the inner surface 103 of the outer tubular body 101 and the outer surface 104 of the inner body 102. The second fluid 120 exchanges heat with the first fluid 110 via the inner surface 103 and the outer surface 104.

In an embodiment, the inner body 102 of the heat exchanger 200 is adapted to rotate relative to the outer tubular body 101 along the axis 202. So the inner body 102 rotates along the axis 202 in addition to moving along the dashed circle 302. Similarly, in an embodiment, the heat exchanger 100 as depicted in FIG. 1, is adapted to move the inner body 102 in the plane perpendicular to the axis 204, in addition to rotating the inner body 102 along the axis 202.

FIGS. 4-9 depict details of yet further embodiments of the invention. FIGS. 4-9 depict a detailed view of the inner body 102 and the outer tubular body 101. The inner body 102 and the outer tubular body 101 may be combined with any one of the embodiments of FIGS. 1-3.

Figure 4:
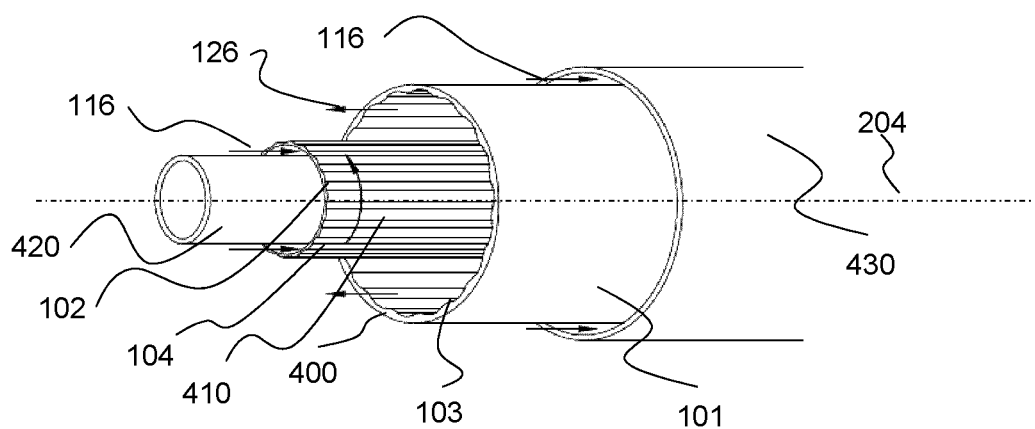

FIG. 4 shows the inner body 102 arranged in the outer tubular body 101. An inner tube 420 is arranged inside the inner body 102. An outer tube 430 is arranged around the outer tubular body 101. The first flow path 116 is between the inner tube 420 and the inner body 102, and is between the outer tubular body 101 and the outer tube 430. The second flow path 126 is in the gap between the outer surface 104 of the inner body 102 and the inner surface 103 of the outer tubular body 101.

The inner surface 103 has a cross-section perpendicular to the longitudinal axis 204 that is non-circular. The cross-section is non-circular, because the inner surface 103 comprises a corrugated shape 400. The corrugated shape 400 is formed by protrusions or by grooves that are arranged rotational-symmetric along the longitudinal axis 204, and which extend along the longitudinal direction. The corrugated shape 400 causes a difference in the gap between the inner body 102 and the outer body 101 as seen along a circumference of the inner body 102. The width and the height of the protrusions or grooves are, for example, selected based on the type of product that is to flow along the second flow path.

The outer surface 104 is provided with a similar corrugated shape 410 as the inner surface 103. The corrugated shape 410 is formed by protrusions or by grooves that are arranged rotational-symmetric along the inner body 102, and which extend along the longitudinal direction of the inner body 102. The corrugated shape 400 causes a further difference in the gap between the inner body 102 and the outer body 101 as seen along a circumference of the inner body 102. The width and the height of the protrusions or grooves are, for example, selected based on the type of product that is to flow along the second flow path. The width and the height of the corrugated shape 410 is, for example, the same or different from the corrugated shape 400. In an alternative embodiment, only the inner surface 103 has the corrugated shape 400, whereas the outer surface 104 has a smooth shape without corrugations.

Figure 5:
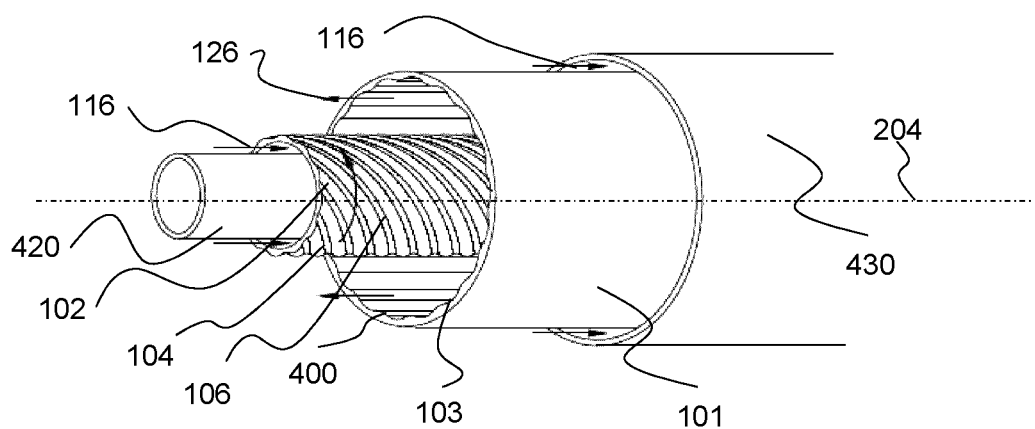

FIG. 5 shows an embodiment, which is the same as the embodiment of FIG. 4, except for the following. Instead of a corrugated shape, the outer surface 104 of the inner body 102 is provided with the second helically shaped element 106.

Figure 6:
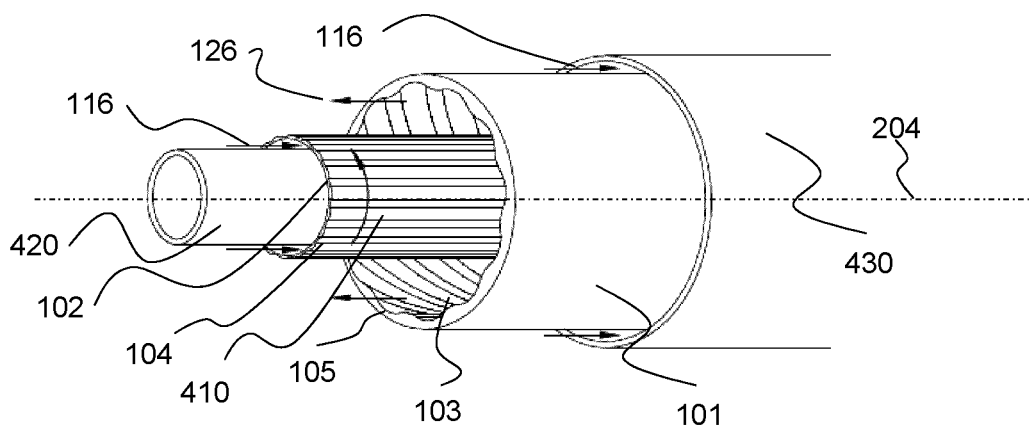

FIG. 6 shows an embodiment, which is the same as the embodiment of FIG. 4, except for the following. The inner surface 103 has a cross-section perpendicular to the longitudinal axis 204 that is non-circular. The cross-section is non-circular, because the inner surface 103 comprises the first helically shaped element 105. The first helically shaped element 105 is formed by protrusions or by grooves that are arranged in a helical shape along the longitudinal axis 204. The outer surface 104 is provided with the corrugated shape 410.

Figure 7:
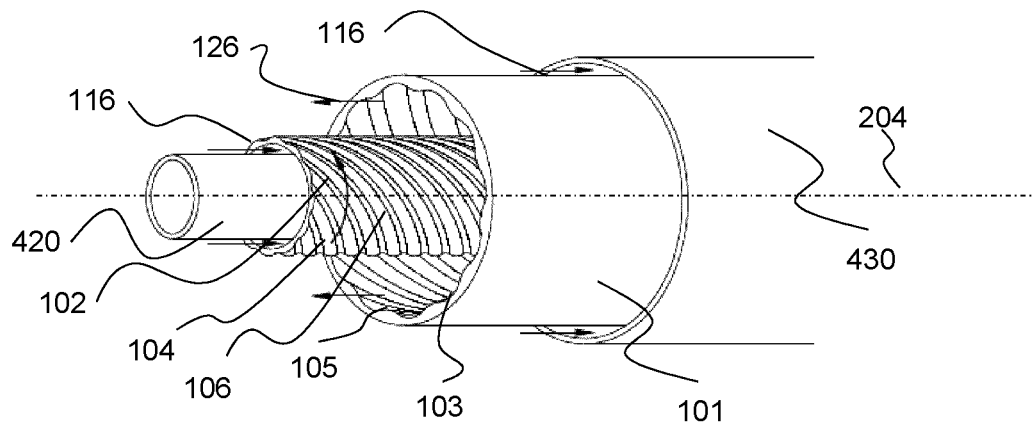

FIG. 7 shows an embodiment, which is the same as the embodiment of FIG. 4, except for the following. The inner surface 103 has a cross-section perpendicular to the longitudinal axis 204 that is non-circular. The cross-section is non-circular, because the inner surface 103 comprises the first helically shaped element 105. The first helically shaped element 105 is formed by protrusions or by grooves that are arranged in a helical shape along the longitudinal axis 204. The outer surface 104 is provided with the second helically shaped element 106. The direction of the first helically shaped element 105 on the inner surface 103 is left-handed. The second helically shaped element 106 on the outer surface 104 is right-handed. The first helically shaped element 105 and the second helically shaped element 106 are directed in opposite directions. Rotating the inner body 102 relative to the tubular outer body 101 creates turbulence and a pressure in the product in the gap.

Figure 8:
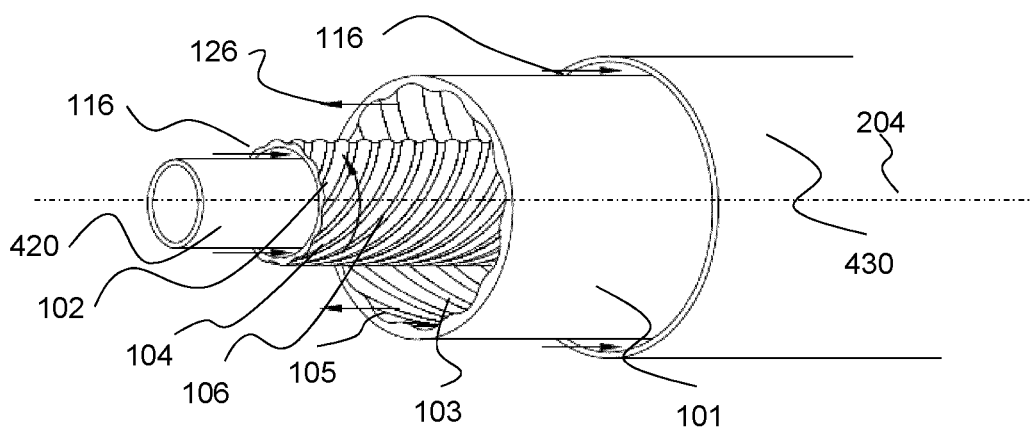

FIG. 8 shows an embodiment, which is the same as the embodiment of FIG. 7, except that the directions of the first helically shaped element 105 and the second helically shaped element 106 are the same. The first helically shaped element 105 and the second helically shaped element 106 are both left-handed. Rotating the inner body 102 relative to the tubular outer body 101 creates turbulence in the product in the gap.

Figure 9:
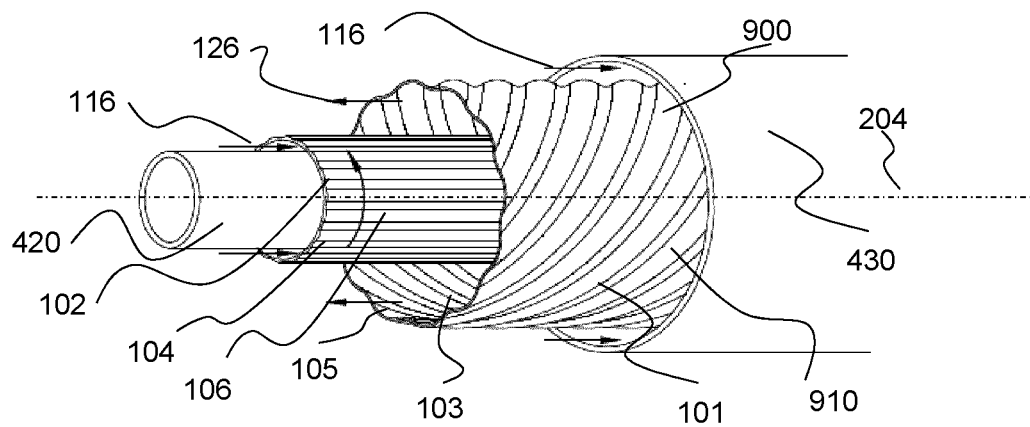

FIG. 9 shows an embodiment, which is the same as the embodiment of FIG. 6, except for the following. The outer tubular body 101 has been formed to have the inner surface 103 with the first helically shaped element 103. In addition, an outer surface 900 of the outer tubular body 101 has been provided with a helically shaped element 910. Due to the thin wall thickness of the outer tubular body 101, the helically shaped element 910 and the first helically shaped element 103 are formed simultaneously when deforming the wall of the outer tubular body 101. The helically shaped element 900 causes the heat carrier liquid that flows between the outer tubular body 101 and the outer tube 430 to become more turbulent, which increases the heat transfer between the heat carrier liquid and the product along the second flow path 126. Instead of the helically shaped element 900, any other suitable shape can be provided on the outer surface 900 of the outer tubular body 101, as long as the cross-section of the outer surface 900 of the outer tubular body 101 along the longitudinal axis 204 is non-circular. The outer tubular body 101 may have the outer surface 900 with the non-circular cross-section in any of the described embodiments.

When rotating the inner body 102 relative to the outer tubular body 101 in the embodiments of FIGS. 4-9, the corrugated shapes 400, 410, the first helically shaped element 105 and/or the second helically shaped element 106 cause the product that flows along the second flow path 126 to become more turbulent, which improves the heat transfer between the product along the second flow path 126 and the heat carrier liquid along the first flow path 116.

The invention claimed is:

1. A heat exchanger adapted to exchange heat between a first fluid and a second fluid, comprising:
an outer tubular body having an inner surface;
an inner body arranged inside the outer tubular body and having an outer surface facing the inner surface of the outer tubular body, leaving free a gap between the inner surface of the outer tubular body and the outer surface of the inner body;
a first inlet and a first outlet arranged to provide a first flow path for the first fluid from the first inlet to the first outlet via a first channel and via a second channel;
a second inlet and a second outlet arranged to provide a second flow path from the second inlet to the second outlet for the second fluid via the gap between the inner surface of the outer tubular body and the outer surface of the inner body, wherein the outer tubular body comprises the first channel, wherein the inner body comprises the second channel, wherein the inner body and the second channel are rotatable relative to the outer tubular body and the first channel, wherein the inner surface extends along a longitudinal axis, wherein a cross-section of the inner surface perpendicular to the longitudinal axis is non-circular.

2. The heat exchanger according to claim 1, wherein the inner surface of the outer tubular body has a first helically shaped element.

3. The heat exchanger according to claim 1, wherein the outer surface of the inner body has a second helically shaped element.

4. The heat exchanger according to claim 1, wherein the inner surface of the outer tubular body has a first helically shaped element, wherein the outer surface of the inner body has a second helically shaped element, and wherein the first helically shaped element and the second helically shaped element each have a longitudinal axis parallel to each other.

5. The heat exchanger according to claim 4, wherein the first helically shaped element and the second helically shaped element are helically shaped in the same direction.

6. The heat exchanger according claim 4, wherein the first helically shaped element and the second helically shaped element are helically shaped in an opposite direction.

7. The heat exchanger according to claim 4, wherein the second helically shaped element is helically shaped in a first direction, and wherein the inner body is rotatable relative to the outer tubular body in a second direction opposite to the first direction.

8. The heat exchanger according to claim 2, wherein at least one of the first helically shaped element and the second helically shaped element is formed by a corrugated shape of respectively the inner surface and/or the outer surface.

9. The heat exchanger according to claim 2, wherein at least one of the first helically shaped element and the second helically shaped element comprises a thread.

10. The heat exchanger according to claim 2, wherein at least one of the first helically shaped element and the second helically shaped element comprises a groove.

11. The heat exchanger according to claim 1, wherein the inner body is elongated along an axis, wherein the inner body is rotatable relative to the outer tubular body along the axis.

12. The heat exchanger according to claim 1, wherein the inner body is elongated along an axis, wherein the inner body is rotatable by moving the axis in a plane perpendicular to the axis.

13. The heat exchanger according to claim 12, wherein the inner body is rotatable by moving the axis along a circular path in the plane perpendicular to the axis.

14. The heat exchanger according to claim 12, comprising a bellow attached to the inner body and the outer tubular body and arranged to create a seal between the outer surface and the inner surface.

15. The heat exchanger according to claim 1, wherein the heat exchanger is a counter-flow heat exchanger, wherein the first flow path are in opposite directions.

16. Use of the heat exchanger according to claim 1, wherein the second fluid has a viscosity of more than 20 cP, preferably more than 100 cP, more preferably more than 500 cP.

17. Use of the heat exchanger according to claim 1, wherein the second fluid is a food product or a feed product.

18. Use of the heat exchanger according to claim 1, wherein the second fluid is a non-food product.

19. A heat exchanger adapted to exchange heat between a first fluid and a second fluid, comprising:
an outer tubular body having an inner surface;
an inner body arranged inside the outer tubular body and having an outer surface facing the inner surface of the outer tubular body, leaving free a gap between the inner surface of the outer tubular body and the outer surface of the inner body;
a first inlet and a first outlet arranged to provide a first flow path for the first fluid from the first inlet to the first outlet via a first channel and via a second channel;
a second inlet and a second outlet arranged to provide a second flow path from the second inlet to the second outlet for the second fluid via the gap between the inner surface of the outer tubular body and the outer surface of the inner body, wherein the outer tubular body comprises the first channel, wherein the inner body comprises the second channel, wherein the inner body is rotatable relative to the outer tubular body, wherein the inner body is elongated along an axis, wherein the inner body is rotatable by moving the axis in a plane perpendicular to the axis.

20. The heat exchanger according to claim 19, wherein the inner body is rotatable by moving the axis along a circular path in the plane perpendicular to the axis.

21. The heat exchanger according to claim 19, comprising a bellow attached to the inner body and the outer tubular body and arranged to create a seal between the outer and the inner surface.

22. The heat exchanger according to claim 19, wherein the inner surface extends along a longitudinal axis, wherein a cross-section of the inner surface perpendicular to the longitudinal axis is non-circular.

23. The heat exchanger according to claim 19, wherein the inner surface of the outer tubular body has a first helically shaped element.

24. The heat exchanger according to claim 19, wherein the outer surface of the inner body has a second helically shaped element.

25. The heat exchanger according to claim 19, wherein the inner surface of the outer tubular body has a first helically shaped element, wherein the outer surface of the inner body has a second helically shaped element, and wherein the first helically shaped element and the second helically shaped element each have a longitudinal axis parallel to each other.

26. The heat exchanger according to claim 25, wherein the first helically shaped element and the second helically shaped element are helically shaped in the same direction.

27. The heat exchanger according claim 25, wherein the first helically shaped element and the second helically shaped element are helically shaped in an opposite direction.

28. The heat exchanger according to claim 25, wherein the second helically shaped element is helically shaped in a first direction, and wherein the inner body is rotatable relative to the outer tubular body in a second direction opposite to the first direction.

29. The heat exchanger according to claim 23, wherein at least one of the first helically shaped element and the second helically shaped element is formed by a corrugated shape of respectively the inner surface and/or the outer surface.

30. The heat exchanger according to claim 23, wherein at least one of the first helically shaped element and the second helically shaped element comprises a thread.

31. The heat exchanger according to claim 23, wherein at least one of the first helically shaped element and the second helically shaped element comprises a groove.

32. The heat exchanger according to claim 19, wherein the inner body is rotatable relative to the outer tubular body along the axis.

33. The heat exchanger according to claim 19, wherein the heat exchanger is a counter-flow heat exchanger, wherein the first flow path and the second flow path are in opposite directions.

34. Use of the heat exchanger according to claim 19, wherein the second fluid has a viscosity of more than 20 cP, preferably more than 100 cP, more preferably more than 500 cP.

35. Use of the heat exchanger according to claim 19, wherein the second fluid is a food product or a feed product.

36. Use of the heat exchanger according to claim 19, wherein the second fluid is a non-food product.

* * * * *